United States Patent
Fukunaga

(10) Patent No.: US 10,211,699 B2
(45) Date of Patent: Feb. 19, 2019

(54) MOTOR AND BUS BAR UNIT HAVING OVERLAPPING BRIDGE PORTIONS

(71) Applicant: NIDEC CORPORATION, Minami-ku, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 343 days.

(21) Appl. No.: 15/031,067

(22) PCT Filed: Sep. 25, 2014

(86) PCT No.: PCT/JP2014/075390
§ 371 (c)(1),
(2) Date: Jul. 11, 2016

(87) PCT Pub. No.: WO2015/060058
PCT Pub. Date: Apr. 30, 2015

(65) Prior Publication Data
US 2016/0329772 A1    Nov. 10, 2016

(30) Foreign Application Priority Data

Oct. 21, 2013   (JP) ................................. 2013-218196

(51) Int. Cl.
*H02K 3/32*    (2006.01)
*H02K 5/22*    (2006.01)
(Continued)

(52) U.S. Cl.
CPC .......... *H02K 5/225* (2013.01); *H01R 25/162* (2013.01); *H01R 25/167* (2013.01); *H02K 3/18* (2013.01);
(Continued)

(58) Field of Classification Search
CPC .......... H02K 5/225; H02K 3/522; H02K 3/50; H02K 2203/09; H02K 3/18; H02K 3/52; H01R 25/162; H01R 25/167
(Continued)

(56) References Cited

U.S. PATENT DOCUMENTS 4,926,075 A   5/1990  Fushiya et al.
5,828,147 A   10/1998 Best et al.
(Continued)

FOREIGN PATENT DOCUMENTS

JP   2003324883 A   11/2003
JP   3717832 B2     11/2005
(Continued)

OTHER PUBLICATIONS

USPTO Notice of Allowance corresponding to U.S. Appl. No. 15/031,072; dated Jan. 22, 2018.
(Continued)

*Primary Examiner* — Michael Andrews
(74) *Attorney, Agent, or Firm* — Hauptman Ham, LLP

(57) ABSTRACT

A bus bar unit used in a motor including a coil may include a plurality of bus bars including a metal material. At least one of the plurality of bus bars may include a body portion extending in substantially a circumferential direction relative to a center axis of the motor; a first terminal portion electrically connected to the coil of the motor; and an arc-shaped bridge portion connecting a first end portion of the body portion to the first terminal portion. The bridge portion may lie across at least an other one of the plurality of bus bars. An axial position of the body portion and an axial position of the first terminal portion may at least partially overlap with each other.

20 Claims, 10 Drawing Sheets

(51) Int. Cl.
*H02K 3/52* (2006.01)
*H01R 25/16* (2006.01)
*H02K 3/18* (2006.01)

(52) U.S. Cl.
CPC ......... *H02K 3/522* (2013.01); *H02K 2203/09* (2013.01); *Y02P 80/30* (2015.11)

(58) Field of Classification Search
USPC ...................................................... 310/71, 50
See application file for complete search history.

(56) References Cited

U.S. PATENT DOCUMENTS

| | | | |
|---|---|---|---|
| 6,856,057 B2 | 2/2005 | Kobayashi et al. | |
| 7,034,419 B2 | 4/2006 | Kabasawa et al. | |
| 7,518,853 B2 | 4/2009 | Kato et al. | |
| 7,579,729 B2 | 8/2009 | Takashima et al. | |
| 7,595,572 B2 | 9/2009 | Haga et al. | |
| 8,836,186 B2 | 9/2014 | Katou et al. | |
| 8,922,080 B2 | 12/2014 | Nakagawa et al. | |
| 2007/0296292 A1 | 12/2007 | Kienzler et al. | |
| 2008/0136274 A1 | 6/2008 | Fujii et al. | |
| 2009/0026860 A1 | 1/2009 | Ohuchi et al. | |
| 2009/0251018 A1* | 10/2009 | Koshida | H02K 5/225 310/71 |
| 2010/0033044 A1 | 2/2010 | Isshiki et al. | |
| 2010/0187924 A1* | 7/2010 | Yagai | H02K 3/522 310/71 |
| 2012/0019081 A1 | 1/2012 | Tamura et al. | |
| 2012/0262014 A1 | 10/2012 | Katou et al. | |
| 2013/0181569 A1* | 7/2013 | Nakagawa | H02K 3/522 310/195 |
| 2014/0028130 A1* | 1/2014 | Sonoda | H02K 3/522 310/71 |
| 2016/0241098 A1* | 8/2016 | Fukunaga | H02K 3/522 |

FOREIGN PATENT DOCUMENTS

| | | |
|---|---|---|
| JP | 2007259642 A | 10/2007 |
| JP | 2007330035 A | 12/2007 |
| JP | 2008148481 A | 6/2008 |
| JP | 2009033850 A | 2/2009 |
| JP | 2010041898 A | 2/2010 |
| JP | 2010239771 A | 10/2010 |
| JP | 2011182511 A | 9/2011 |

OTHER PUBLICATIONS

International Search Report corresponding to Application No. PCT/JP2014/075389; dated Dec. 16, 2014, with English translation.
International Search Report corresponding to Application No. PCT/JP2014/075390; dated Dec. 16, 2014, with English translation.

* cited by examiner

MOTOR AND BUS BAR UNIT HAVING OVERLAPPING BRIDGE PORTIONS

CROSS REFERENCE TO RELATED APPLICATIONS

This is the U.S. national stage of application No. PCT/JP2014/075390, filed on Sep. 25, 2014. Priority under 35 U.S.C. § 119(a) and 35 U.S.C. § 365(b) is claimed from Japanese Applications No. 2013-218196, filed Oct. 21, 2013, the disclosure of which is incorporated herein by reference.

FIELD OF THE DISCLOSURE

The present disclosure relates to a bus bar unit and a motor.

BACKGROUND

The existing motor having a structure in which a conductive part called a bus bar is disposed above a coil and the coil is electrically connected to an external power supply through the conductive part has been known. Generally, the bus bar is connected to a plurality of coils arranged in an annular shape and therefore may be mainly formed in an annular shape or an arch shape. However, when a copper plate as a raw material is subject to punching process with a press machine into an annular shape or an arc shape, a lot of wasteful portions may occur in the copper plate and a yield of the material may be aggravated.

In this respect, Japanese Patent Publication No. 3717832 discloses that a bus bar is manufactured by punching a conductive metal plate member, such as a copper plate or the like, with a press machine into a stripe shape and bending the stripe-shaped preformed material in a thickness direction. The Japanese Patent No. 3717832 discloses that the yield rate can be improved by punching the stripe-shaped preformed materials in parallel.

However, in the specification of Japanese Patent No. 3717832, a plurality of tabs protrude from a substantially C-shaped bus bar. These tabs are formed in the conductive metal plate simultaneously when the conductive metal plate is punched by the press machine. Therefore, the bus bars and the tabs are integrally formed in the state in which they are connected to each other by going through a one-time pressure process.

As such, in the structure of the specification of Japanese Patent Publication No. 3717832, with a plurality of tabs, the shape of the stripe-shaped material punched in the press process becomes complicated. For this reason, a wasteful portion still remains in the conductive metal plate. To reduce manufacturing costs of the motor, there is a need to further increase the yield of the material.

However, when the bus bar unit including the plurality of bus bars is used, there is a need to suppress the overall size of the bus bar unit while preventing these bus bars from being in contact with each other. That is, a structure capable of increasing the yield of the material and suppressing the size of the bus bar unit is required.

SUMMARY

In a first exemplary embodiment of the present disclosure, a bus bar unit used in a motor has a plurality of bus bars made of a metal material. At least one of the plurality of bus bars has a body portion, a first terminal portion, and a bridge portion. The body portion extends in substantially a circumferential direction with respect to a center shaft of the motor. The first terminal portion is electrically connected to a coil of the motor. The bridge portion has an arch shape and connects an end portion of one side of the body portion to the first terminal portion. The bridge portion lies across at least another one of the plurality of bus bars, and an axial position of the body portion and an axial position of the first terminal portion at least partially overlap with each other.

The above and other elements, features, steps, characteristics and advantages of the present disclosure will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, exemplary embodiments of the present disclosure will be described with reference to the accompanying drawings. Further, in the following descriptions, a direction parallel with a center axis of a motor is called an [axial direction], a direction orthogonal to the center axis of the motor is called a [radial direction], and a direction along an arc based on the center axis of the motor is called a [circumferential direction]. Further, in the following descriptions, a shape or a positional relation of each part will be described by defining the axial direction as a vertical direction and disposing a bus bar unit above a coil. However, the definition of the vertical direction does not intend on limiting a direction in manufacturing and using a motor according to the present disclosure.

Further, the [parallel direction] in the following descriptions includes other substantially parallel directions. Further, the [orthogonal direction] in the following descriptions includes other substantially orthogonal directions.

1. First Embodiment

Figure 1:
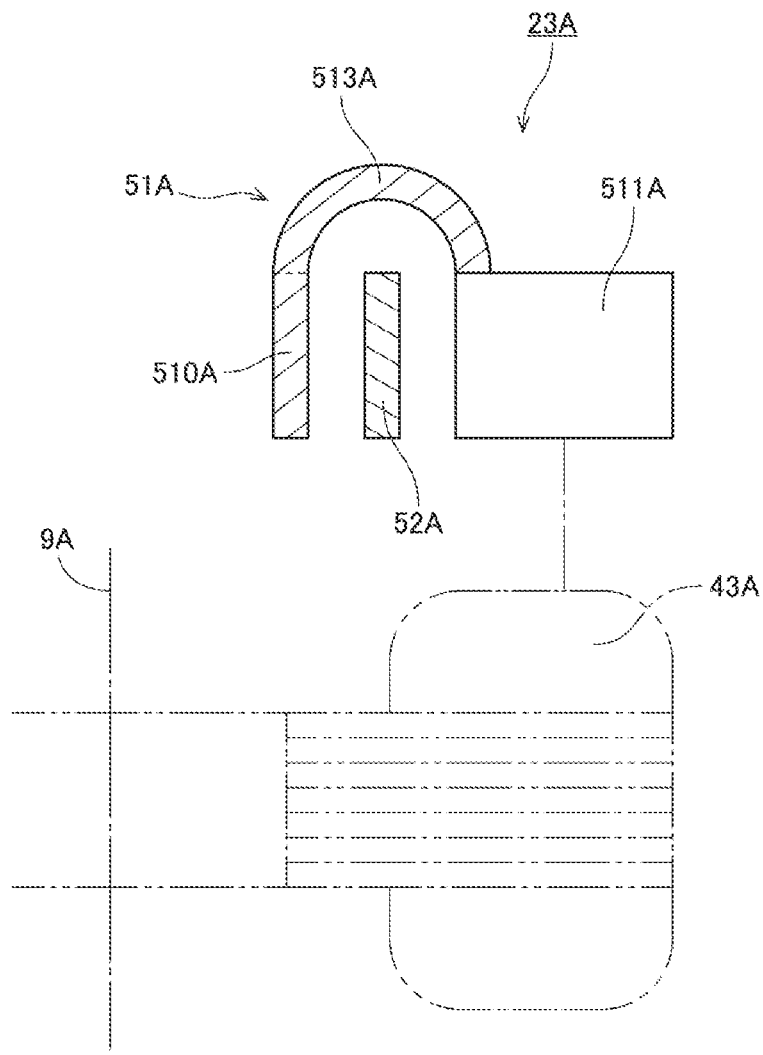
FIG. 1 is a longitudinal cross-sectional view of a bus bar unit according to a first embodiment.

FIG. 1 is a longitudinal cross-sectional view of a bus bar unit 23A according to a first embodiment of the present disclosure. The bus bar unit 23A is used in a motor. The bus bar unit 23A serves to electrically connect a coil 43A to an external power supply. As illustrated in FIG. 1, the bus bar unit 23A has two bus bars 51A and 52A made of a metal material.

One bus bar 51A of the two bus bars 51A and 52A has a body portion 510A, a first terminal portion 511A, and a bridge portion 513A. The body portion 510A extends in substantially a circumferential direction with respect to a center axis 9A of the motor. The first terminal portion 511A is electrically connected to a coil 43A of the motor. An axial position of the body portion 510A and an axial position of the first terminal portion 511A at least partially overlap with each other.

An end portion of one side of the body portion 510A and the first terminal portion 511A are connected to each other by an arch-shaped bridge portion 513A. As illustrated in FIG. 1, the bridge portion 513A lies across another bus bar 52A of the other side.

In the bus bar unit 23A, the first terminal portion 511A extends from an end portion of the body portion 510A through the bridge portion 513A. For this reason, the first terminal portion 511A needs not to protrude in an axial direction or a radial direction from places other than the end portion of the body portion 510A. By doing so, it is possible to increase a yield of material. The first terminal portion 511A may extend in the radial direction while the body portion 510A of one bus bar 51A is disposed at a position where it overlaps with the other bus bar 52A in the radial direction. Further, both bus bars 51A and 52A may avoid contacting each other while the body portion 510A of one bus bar 51A is disposed at a position where it overlaps with the other bus bar 52A in the radial direction. As a result, it is possible to suppress a size of the bus bar unit 23A.

2. Second Embodiment

<2-1. Overall Structure of Motor>

Figure 2:
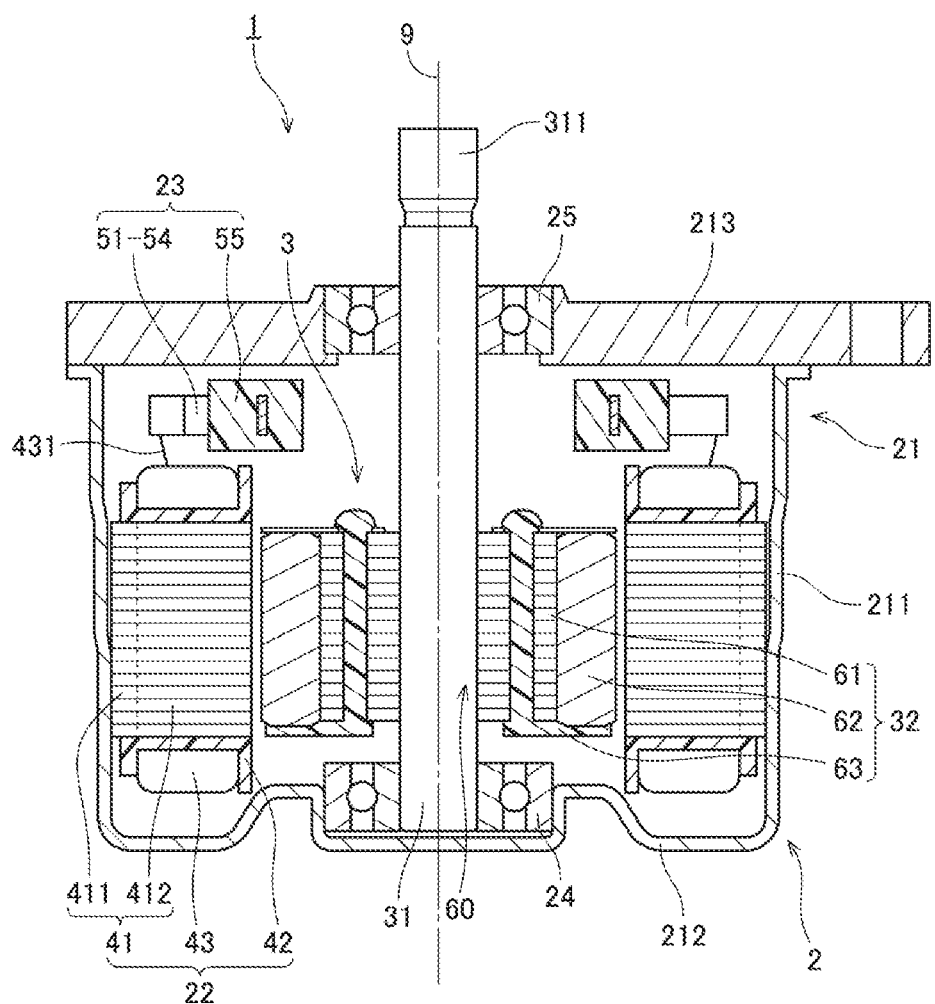
FIG. 2 is a longitudinal cross-sectional view of a motor according to a second embodiment.

FIG. 2 is a longitudinal cross-sectional view of the motor 1 according to the second embodiment. The motor 1 according to the present embodiment is equipped in, for example, a vehicle and is used to generate a driving force of a power steering. However, the motor of the present disclosure may also be used for purposes in addition to the power steering. For example, the motor of the present disclosure may also be used as a driving source for other parts of a vehicle, for example, a fan for engine cooling or an oil pump. Further, as the motor of the present disclosure, any motor which is equipped in home electronics, OA equipment, medical instruments, etc., and generates various kinds of driving forces may be used.

The motor 1 is a so-called inner rotor type motor in which a rotor 32 is disposed inside in a radial direction of a stator 22. As illustrated in FIG. 2, the motor 1 has a stationary unit 2 and a rotary unit 3. The stationary unit 2 is fixed to an edge body of a device to be driven. The rotary unit 3 is rotatably supported to the stationary unit 2.

The stationary unit 2 has a housing 21, the stator 22, a bus bar unit 23, a lower bearing portion 24, and an upper bearing portion 25.

The housing 21 has a cylindrical portion 211, a bottom plate portion 212, and a cover portion 213. The cylindrical portion 211 extends in substantially a cylindrical shape axially from an outside in the radial direction of the stator 22 and the bus bar unit 23. The bottom plate portion 212 is expanded substantially vertically to a center axis 9 from a lower portion of the stator 22 and the rotor 32 to be described below. The cover portion 213 is expanded substantially vertically to the center axis 9 from an upper portion of the bus bar unit 23. The stator 22, the bus bar unit 23, and the rotor 32 to be described below are accommodated in the housing 21.

The cylindrical portion 211, the bottom plate portion 212, and the cover portion 213 are made of metals such as aluminum and stainless. In this embodiment, the cylindrical portion 211 and the bottom plate portion 212 are configured of a single member and the cover portion 213 is made of different materials from the cylindrical portion 211 and the bottom portion 212. However, the cylindrical portion 211 and the cover portion 213 may be configured of a single member and the bottom plate portion 212 may be configured of different members from the cylindrical portion 211 and the cover portion 213.

The stator 22 is disposed outside in the radial direction of the rotor 32 to be described below. The stator 22 has a stator core 41, an insulator 42, and a plurality of coils 43. The stator core 41 is configured of a stacked steel sheet in which electromagnetic steel sheets are stacked axially. The stator core 41 has an annular core back 411 and a plurality of teeth 412. The core back 411 is disposed at substantially the same axis with the center axis 9. An outer circumferential surface of the core back 411 is fixed to an inner circumferential surface of the cylindrical portion 211 of the housing 21. The plurality of teeth 412 protrude from the core back 411 toward the inside in the radial direction. The plurality of teeth 412 are arranged at substantially an equal interval in the circumferential direction.

A material of the insulator 42 preferably is resin which is an insulator. Upper surfaces and lower surfaces of each tooth 412 and both end surfaces in the circumferential direction thereof are covered with the insulator 42. The coil 43 is configured of a lead wire 431 wound around the insulator 42. That is, according to this embodiment, the lead wire 431 is wound around the teeth 412, which is a magnetic core, through the insulator 42. The insulator 42 is interposed between the teeth 412 and the coil 43 to prevent the teeth 412 and the coil 43 from being electrically short-circuited.

Further, instead of the insulator 42, a surface of the teeth 412 may suffer from insulating coating.

The bus bar unit 23 has bus bars 51 to 54 and a bus bar holder 55. The bus bars 51 to 54 are made of metals such as copper which is a conductor. The bus bar holder 55 is made of a resin material and holds the bus bars 51 to 54. The bus bars 51 to 54 are electrically connected to the lead wire 431 configuring the coil 43. Upon the use of the motor 1, the lead wire extending from the external power supply is connected to the bus bars 51 to 54. That is, the coil 43 and the external power supply are electrically connected to each other through the bus bars 51 to 54.

In FIG. 2, the bus bar unit 23 is disposed above the stator 22 and below the cover portion 213. However, the bus bar unit 23 may be disposed above the cover portion 213. A more detailed structure of the bus bar unit 23 will be described below.

The lower bearing portion 24 and the upper bearing portion 25 are disposed between the housing 21 and the shaft 31 of the rotary unit 3. According to this embodiment, as the lower bearing portion 24 and the upper bearing portion 25, a ball bearing is used. The ball bearing rotates an outer wheel and an inner wheel with respect to each other through a spherical body. By doing so, the shaft 31 is rotatably supported to the housing 21. However, instead of the ball bearing, other bearings such as a sliding bearing and a hydraulic bearing may be used as the lower bearing portion 24 and the upper bearing portion 25.

The rotary unit 3 has the shaft 31 and the rotor 32.

The shaft 31 is a columnar member extending along the center axis 9. The shaft 31 is preferably made of stainless. The shaft 31 rotates based on the center axis 9 while being supported by the above-mentioned lower bearing portion 24 and upper bearing portion 25. An upper end portion 311 of the shaft 31 protrudes above the cover portion 213. The upper end portion 311 is connected to an apparatus to be driven through a power delivery mechanism such as a gear.

The rotor 32 is positioned inside in the radial direction of the stator 22 and rotates simultaneously with the shaft 31. The rotor 32 has a rotor core 61, a plurality of magnets 62, and a magnet holder 63. The rotor core 61 is configured of a stacked steel sheet in which electromagnetic steel sheets are stacked axially. A center of the rotor core 61 is provided with an insertion hole 60 extending axially. The shaft 31 is press-fitted into the insertion hole 60 of the rotor core 61. By doing so, the rotor core 61 and the shaft 31 are fixed to each other.

The plurality of magnets 62 are fixed to an outer circumferential surface of the rotor core 61 by, for example, an adhesive, etc. A surface of an outside in a radial direction of each magnet 62 becomes a magnetic pole surface facing an end surface inside in a radial direction of the teeth 412. The plurality of magnets 62 are arranged in a circumferential direction, and N poles and S poles thereof are alternately arranged. Further, instead of the plurality of magnets 62, one annular magnet in which the N poles and the S poles are alternately magnetized in a circumferential direction may be attached to the rotor core 61.

The magnet holder 63 is a member made of a resin material and fixed to the rotor core 61. The magnet holder 63, for example, is obtained by being insert-molded using the rotor core 61 as an insert portion. Lower surfaces of the plurality of magnets 62 and both end surfaces in a circumferential direction thereof come in contact with the magnet holder 63. By doing so, each magnet 62 is positioned in the circumferential direction and the axial direction. Further, the rigidity of the whole rotor 32 is increased by attaching the magnet holder 63 to the rotor core 61.

If the coil 43 is supplied with a driving current from the external power supply through the bus bars 51 to 54, a magnetic flux is generated in the plurality of teeth 412. A torque in the circumferential direction is generated between the rotor 32 and the stator 22 by an action of the magnetic flux between the teeth 412 and the magnet 62. As a result, the rotary unit 3 may rotate with respect to the stationary unit 2, based on the center axis 9.

<2-2. For Connection Configuration of Coil>

Figure 3:
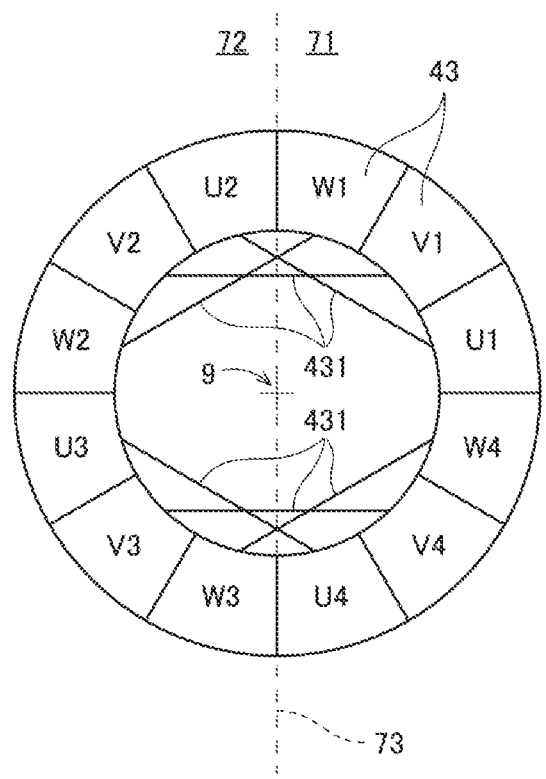
FIG. 3 is a diagram conceptually illustrating a connection structure of a coil according to a second embodiment.
Figure 4:
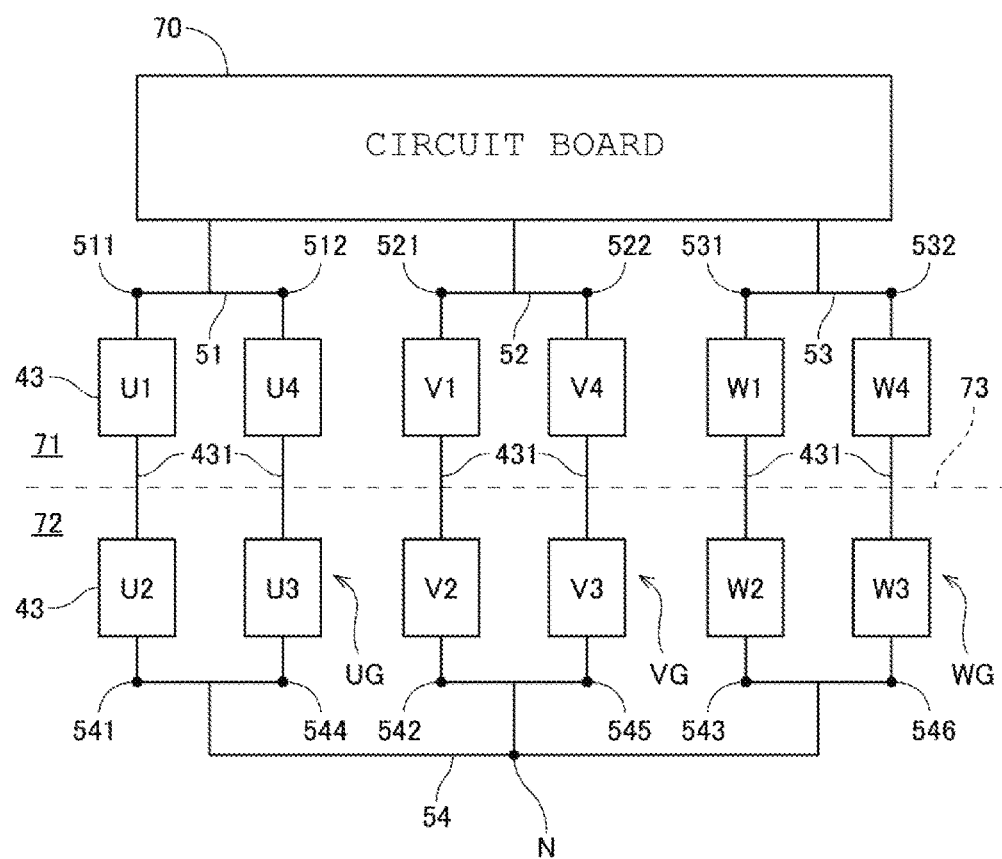
FIG. 4 is a diagram conceptually illustrating a connection structure of a coil according to a second embodiment.

The motor 1 of this embodiment is a 3-phase synchronous motor which is driven with a 3-phase alternating current of a U phase, a V phase, and a W phase. FIGS. 3 and 4 are diagrams conceptually illustrating the connection configuration of the lead wire 431 configuring the coil 43. As illustrated in FIGS. 3 and 4, the stator 22 has 12 coils 43. The 12 coils 43 includes four U-phase coils 43 U1 to U4, four V-phase coils 43 V1 to V4, and four W-phase coils 43 W1 to W4. These coils 43 are arranged in a circumferential direction at an equal angle interval in order of U1, V1, W1, U2, V2, W2, U3, V3, W3, U4, V4, and W4.

As conceptually illustrated in FIG. 3, six pairs of coils U1 and U2, U3 and U4, V1 and V2, V3 and V4, W1 and W2, and W3 and W4 are each configured of one continued lead wire 431. That is, as illustrated in FIG. 4, these six pairs of coils are each connected to each other in series. The coil pair of U1 and U2 and the coil pair of U3 and U4 are connected to each other in parallel to form a U-phase coil group UG. The coil pair of V1 and V2 and the coil pair of V3 and V4 are connected to each other in parallel to form a V-phase coil group VG. The coil pair of W1 and W2 and the coil pair of W3 and W4 are connected to each other in parallel to form a W-phase coil group WG.

One end portion of the U-phase coil group UG, one end portion of the V-phase coil group VG, and one end portion of the W-phase coil group WG are electrically connected to a circuit board 70 including a microcontroller. The other end portion of the U-phase coil group UG, the other end portion of the V-phase coil group VG, and the other end portion of the W-phase coil group WG are electrically connected to one another at a neutral point N. That is, in this embodiment, the U-phase coil group UG, the V-phase coil group VG, and the W-phase coil group WG are connected to one another by a Y connection.

As illustrated in FIGS. 3 and 4, the coils 43 U1, V1, W1, U4, V4, and W4 of one side of each coil pair is disposed in a first space 71. The first space 71 is one space divided by a plane 73 including the center axis 9. All the coils 43 of one side of each of the pairs of coils is a coil connected to the circuit board 70. Further, in this embodiment, the coils 43 U2, V2, W2, U3, V3, and W3 of the other side of each coil pair is disposed in a second space 72. The second space 72 is the other space divided by the above-mentioned plane 73. All the coils 43 U2, V2, W2, U3, V3, and W3 of the other side of each coil pair are connected to the neutral point N. Further, the interface is disposed between the bus bars 51 to 54 and the circuit board 70 and may electrically connect the bus bars 51 to 54.

<2-3. Configuration of Bus Bar Unit>

Figure 5:
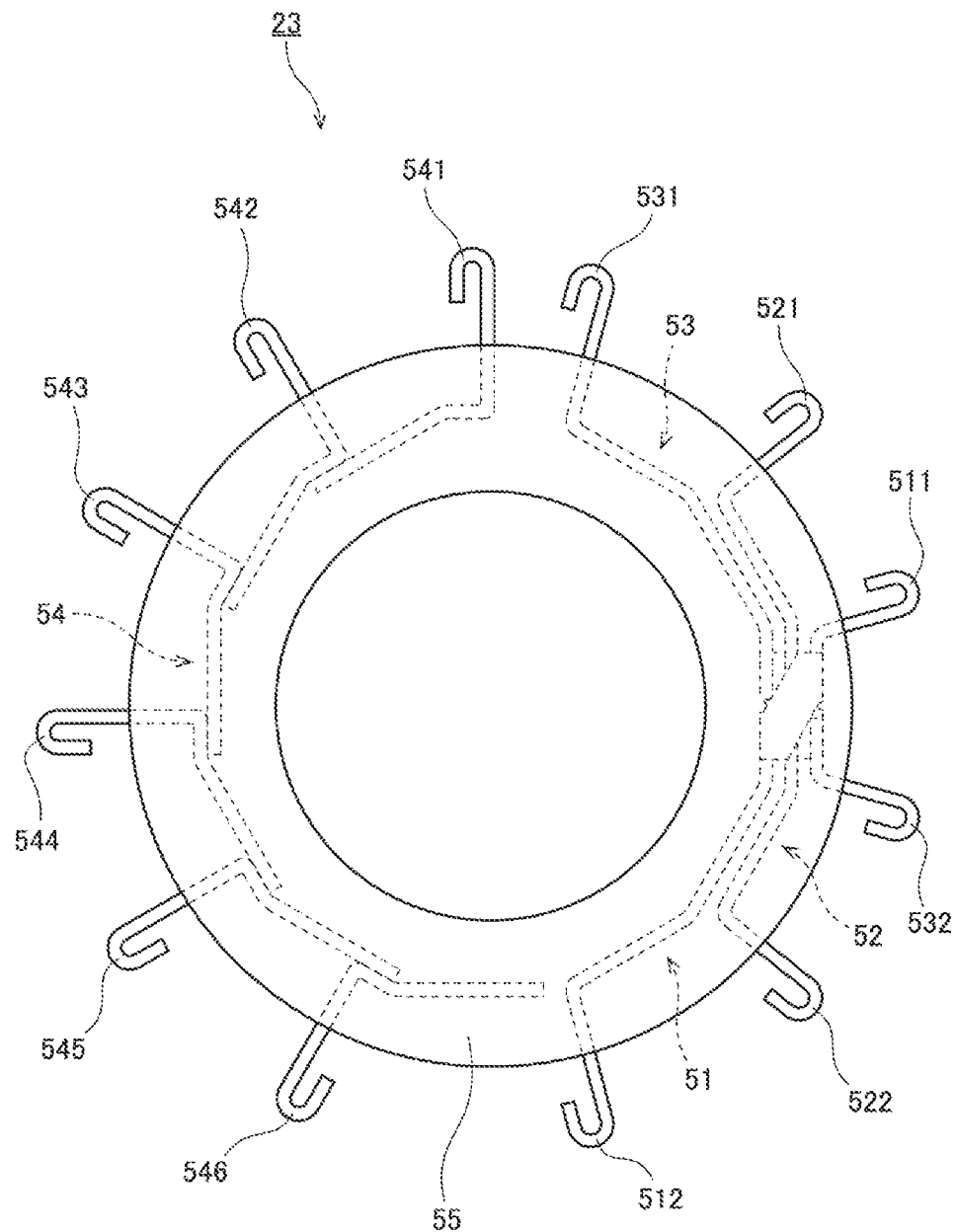
FIG. 5 is a top view of a bus bar unit according to a second embodiment.

FIG. 5 is a top view of the bus bar unit 23. As illustrated in FIG. 5, the bus bar unit 23 has a U phase bus bar 51, a V phase bus bar 52, a W phase bus bar 53, a bus bar 54 for the neutral point, and the bus bar holder 55 holding these bus bars 51 to 54. The bus bar holder 55 is a resin molding product using portions of each of the U phase bus bar 51, the V phase bus bar 52, the W phase bus bar 53, and the bus bar 54 for the neutral point as an insert portion.

The U phase bus bar 51 has two U phase terminal portions 511 and 512. The two U phase terminal portions 511 and 512 are disposed in the above-mentioned first space 71. The U phase terminal portions 511 and 512 are each connected to end portions of the lead wires 431 drawn out from each coil 43 of U1 and U4. That is, as illustrated in FIG. 4, the circuit board 70 and each coil 43 of U1 and U4 are electrically connected to each other through the U phase bus bar 51.

The V phase bus bar 52 has two V phase terminal portions 521 and 522. The two V phase terminal portions 521 and 522 are disposed in the above-mentioned first space 71. The V phase terminal portions 521 and 522 are each connected to the end portions of the lead wires 431 drawn out from each coil 43 of V1 and V4. That is, as illustrated in FIG. 4, the circuit board 70 and each coil 43 of V1 and V4 are electrically connected to each other through the V phase bus bar 52.

The W phase bus bar 53 has two W phase terminal portions 531 and 532. The two W phase terminal portions 531 and 532 are disposed in the above-mentioned first space 71. The W phase terminal portions 531 and 532 are each connected to the end portions of the lead wires 431 drawn out from each coil 43 of W1 and W4. That is, as illustrated in FIG. 4, the circuit board 70 and each coil 43 of W1 and W4 are electrically connected to each other through the W phase bus bar 53.

The bus bar 54 for the neutral point has six terminal points 541 to 546 for the neutral point. The six terminal portions 541 and 546 for the neutral point are disposed in the above-mentioned second space 72. The six terminal portions 541 and 546 for the neutral point are each connected to the end portions of the lead wires 431 drawn out from each coil 43 of U2, V2, W2, U3, V3, and W3. That is, as illustrated in FIG. 4, the neutral point N and each coil of U2, V2, W2, U3, V3, and W3 are electrically connected to each other through the bus bar 54 for the neutral point.

Figure 6:
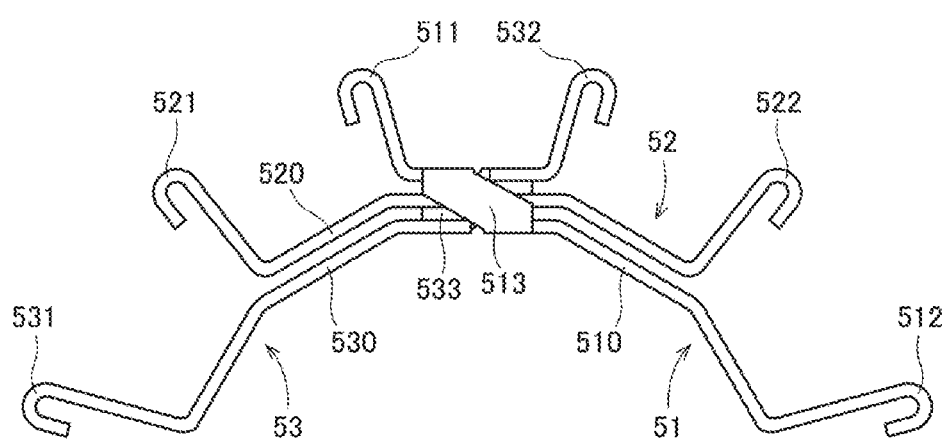
FIG. 6 is a top view of a U phase bus bar, a V phase bus bar, and a W phase bus bar according to a second embodiment.
Figure 7:
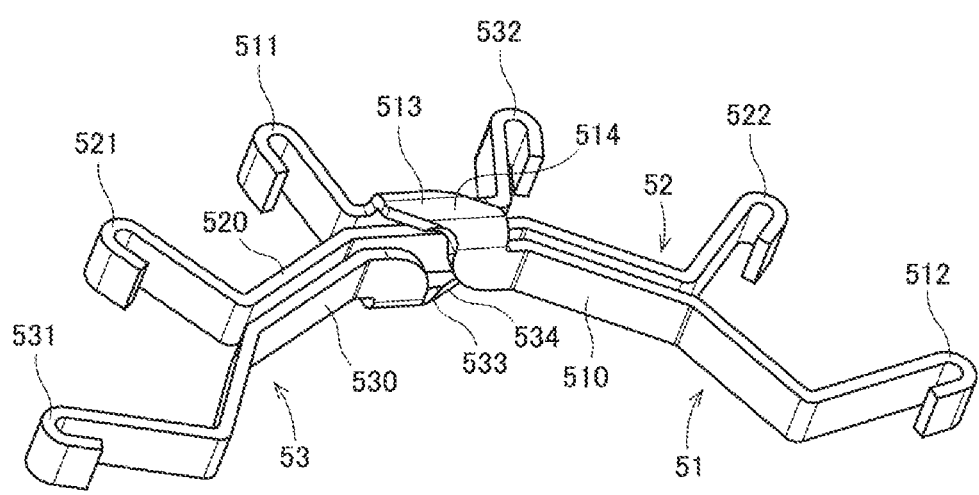
FIG. 7 is a perspective view of a U phase bus bar, a V phase bus bar, and a W phase bus bar according to a second embodiment.

FIG. 6 is a top view of the U phase bus bar 51, the V phase bus bar 52, and the W phase bus bar 53. FIG. 7 is a perspective view of the U phase bus bar 51, the V phase bus bar 52, and the W phase bus bar 53. As illustrated in FIGS. 6 and 7, according to this embodiment, the U phase bus bar 51, the V phase bus bar 52, and the W phase bus bar 53 all are a bent stripe-shaped board. These bus bars 51 to 53 are disposed to approach each other but are insulated from each other by the bus bar holder 55.

The U phase bus bar 51 has the body portion 510, the first terminal portion 511, the second terminal portion 512, and the bridge portion 513. The body portion 510 extends in substantially the circumferential direction in the inside in the radial direction more than the V phase bus bar 52. The first terminal portion 511 is positioned outward in the radial direction more than an arc-shaped portion 520 of the V phase bus bar 52 to be described below. According to this embodiment, a center position in the axial direction of the body portion 510 and a center position in the axial direction of the first terminal portion 511 are substantially the same as each other. An end portion of one side of the body portion 510 and the first terminal portion 511 are connected to each other through the arch-shaped bridge portion 513. The second terminal portion 512 extends toward the outside in the radial direction from an end portion of the other side of the body portion 510.

The first terminal portion 511 and the second terminal portion 512 have substantially a U-letter shape when viewed from the top. The tips of each of the first terminal portion 511 and the second terminal portion 512 are toward the inside in the radial direction. When incorporated in the motor 1, the first terminal portion 511 and the second terminal portion 512 become the above-mentioned U phase terminal portions 511 and 512.

The V phase bus bar 52 has the arc-shaped portion 520 and the pair of terminal portions 521 and 522. The arc-shaped portion 520 extends in substantially the circumferential direction from the outside in the radial direction more than each of the body portions 510 and 530 of the U phase bus bar 51 and the W phase bus bar 53 and the inside of the radial direction more than each of the first terminal portions 511 and 513 of the U phase bus bar 51 and the W phase bus bar 53. The pair of terminal portions 521 and 522 extends toward the outside in the radial direction from both ends in a circumferential direction of the arc-shaped portion 520, respectively.

The pair of terminal portions 521 and 522 has substantially a U-letter shape when viewed from the top. The tips of each of the pair of terminal portions 521 and 522 are toward the inside in the radial direction. When incorporated in the motor 1, the pair of terminal portions 521 and 522 becomes the above-mentioned V phase terminal portions 521 and 522.

The W phase bus bar 53 has the body portion 530, the first terminal portion 532, the second terminal portion 531, and the bridge portion 523. The body portion 530 extends in substantially the circumferential direction in the inside in the radial direction more than the V phase bus bar 52. The first terminal par 532 is positioned more outward in the radial direction than an arc-shaped portion 520 of the V phase bus bar 52. According to this embodiment, a center position in the axial direction of the body portion 530 and a center position in the axial direction of the first terminal portion 532 are substantially the same as each other. An end portion of one side of the body portion 530 and the first terminal portion 532 are connected to each other through the arch-shaped bridge portion 533. The second terminal portion 531 extends toward the outside in the radial direction from an end portion of the other side of the body portion 530.

The first terminal portion 532 and the second terminal portion 531 have substantially a U-letter shape when viewed from the top. The tips of each of the first terminal portion 532 and the second terminal portion 531 are toward the inside in the radial direction. When incorporated in the motor 1, the first terminal portion 532 and the second terminal portion 531 become the above-mentioned W phase terminal portions 532 and 531.

According to this embodiment, the U phase bus bar 51, the V phase bus bar 52, and the W phase bus bar 53 each are the bent board and both end portions thereof have the terminal portion. That is, the terminal portion does not protrude from places other than both ends of the main body portions 510 and 530 and the arc-shaped portion 520 in each of the bus bars 51 to 53. By the above-mentioned structure, in the manufacturing process of the bus bar, it is possible to increase the yield of material.

The body portion 510, the first terminal portion 511, and the second terminal portion 512 of the U phase bus bar 51, the arc-shaped portion 520 and the pair of terminal portions 521 and 522 of the V phase bus bar 52, and the body portion 510, the first terminal portion 511, and the second terminal portion 512 of the W phase bus bar 53 all are bent only in the thickness direction. For this reason, these portions may be easily formed at the time of the manufacturing of each of the bus bars 51 to 53.

The bridge portion 513 of the U phase bus bar 51 lies across an upper side of the arc-shaped portion 520 of the V phase bus bar 52. By doing so, the first terminal portion 511 of the U phase bus bar 51 may extend in the radial direction while the body portion 510 of the U phase bus bar 51 and the arc-shaped portion 520 of the V phase bus bar 52 are disposed at the position where they overlap with the radial direction. Further, the U phase bus bar 51 and the V phase bus bar 52 may avoid contacting each other.

The bridge portion 533 of the W phase bus bar 53 lies across a lower side of the arc-shaped portion 520 of the V phase bus bar 52 in the arch shape. By doing so, the first terminal portion 532 of the W phase bus bar 53 may extend in the radial direction while the body portion 530 of the W phase bus bar 53 and the arc-shaped portion 520 of the V phase bus bar 52 are disposed at the position where they overlap with the radial direction. Further, the W phase bus bar 53 and the V phase bus bar 52 may avoid contacting each other.

According to this embodiment, the bridge portion 513 of the U phase bus bar 51, the arc-shaped portion 520 of the V phase bus bar 52, and the bridge portion 533 of the W phase bus bar 53 cross each other when viewed from the plane. The three bus bars 51 to 53 are disposed at the overlapping position when viewed from the plane, and a size of three bus bars 51 to 53 is miniaturized as a whole.

Further, the bridge portion 513 of the U phase bus bar 51 passes through an upper portion of the V phase bus bar 52. The bridge portion 533 of the W phase bus bar 53 passes through a lower portion of the V phase bus bar 52. However, the bridge portion 513 of the U phase bus bar 51 may pass through the lower portion of the V phase bus bar 52 and the bridge portion 533 of the W phase bus bar 53 may pass through the upper portion of the V phase bus bar 52.

According to this embodiment, the bridge portion 513 of the U phase bus bar 51 has a top plate portion 514. The top plate portion 514 is positioned at the upper portion of the arc-shaped portion 520 of the V phase bus bar 52. The top plate portion 514 is expanded in substantially the vertical direction to the center axis 9. The bridge portion 513 has the flat top plate portion 514 to suppress the bridge portion 513 from protruding up. As a result, it is possible to suppress a height in the axial direction of the U phase bus bar 51.

According to this embodiment, the bridge portion 533 of the W phase bus bar 53 has a top plate portion 534. The top plate portion 534 is positioned at the lower portion of the arc-shaped portion 520 of the V phase bus bar 52. The top plate portion 534 is expanded in substantially the vertical direction to the center axis 9. The bridge portion 533 has the flat top plate portion 534 to suppress the bridge portion 533 from protruding down. As a result, it is possible to suppress a height in the axial direction of the W phase bus bar 53.

According to this embodiment, the shape of the U phase bus bar 51 may be the same as that of the W phase bus bar 53. For this reason, the bus bar having the same shape may be mass produced and the bus bars thereof may be used as the U phase bus bar 51 or the W phase bus bar 53. By doing so, it is possible to more reduce the waste of material upon the manufacturing of the bus bar.

According to this embodiment, the body portion 510 of the U phase bus bar 51 and the body portion 530 of the W phase bus bar 53 are disposed at different positions in the circumferential directions. For this reason, the body portion 510 of the U phase bus bar 51 and the body portion 530 of the W phase bus bar 53 do not overlap with each other in the radial direction. By doing so, it is possible to reduce the overlapping of the plurality of bus bars 51 to 53 in the radial direction. As the result, the whole dimension in the radial direction of the bus bar unit 23 may be more suppressed.

As such, when the plurality of coils such as the UVW phases are alternately disposed in the circumferential direction, each of the phase bus bars needs to be disposed to be intricate complexly. Even in the case, if the body portions of two or more bus bars are disposed in the same radial direction, the bus bar unit may be miniaturized in the radial direction.

<2-4. Manufacturing Sequence of Bus Bar Unit>

Figure 8:
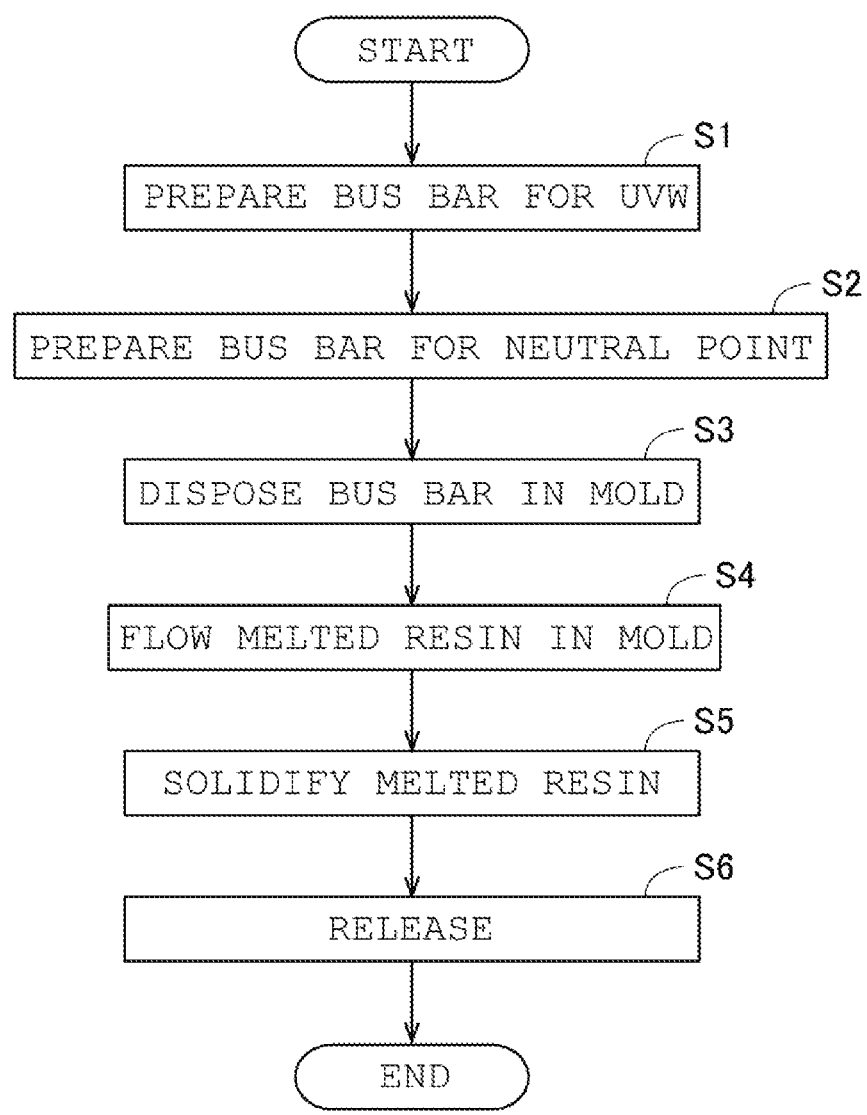
FIG. 8 is a flow chart of a manufacturing sequence of the bus bar unit according to the second embodiment.

FIG. 8 is a flow chart illustrating a manufacturing sequence of the bus bar unit 23. At the time of manufacturing the bus bar unit 23, the U phase bus bar 51, the V phase bus bar 52, and the W phase bus bar 53 are each prepared (step S1). The U phase bus bar 51, the V phase bus bar 52, and the W phase bus bar 53 are obtained by bending the board made of a metal material by the press machine as described above.

Figure 9:
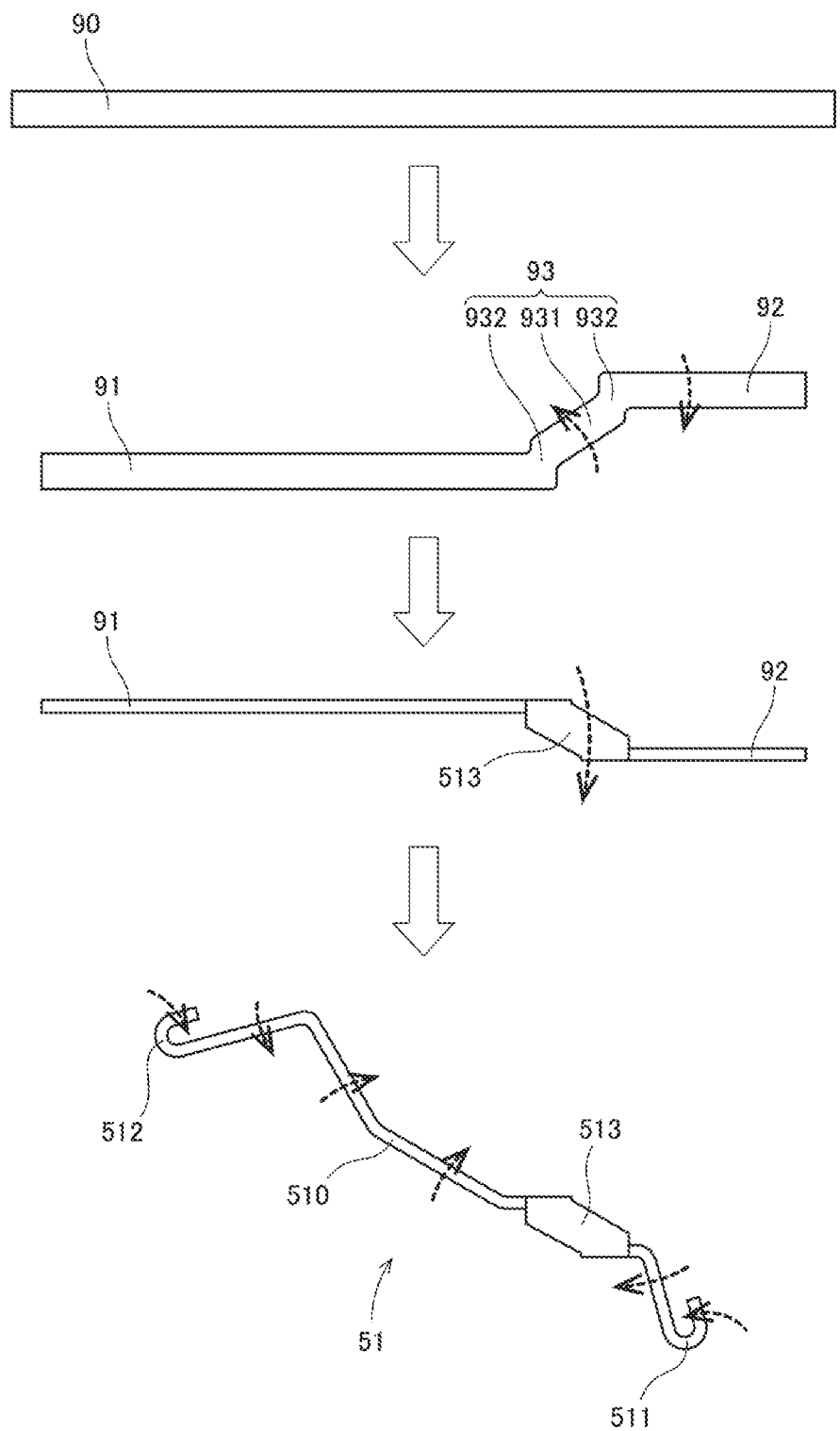
FIG. 9 is a diagram illustrating manufacturing conditions of the U phase bus bar.

FIG. 9 is a diagram illustrating manufacturing conditions of the U phase bus bar 51. In FIG. 9, the machining direction by the press machine is represented by a broken arrow. The broken arrow is a diagram of the post-machining. At the time of manufacturing the U phase bus bar 51, first, one stripe-shaped metal plate 90 is bent in a direction along the plate surface. By doing so, as illustrated in the second diagram from above in FIG. 9, the metal plate 90 is bent in substantially an S shape. That is, the metal plate 90 is in the state in which it has two straight portions 91 and 92 extending in substantially the same direction and a relay portion 93 inclinedly connecting therebetween. Next, the two straight portions 91 and 92 are disposed at the same height position by bending the relay portion 93 in a thickness direction. By doing so, as illustrated in the third diagram from above in FIG. 9, the relay portion 93 is bent in an arch shape. As a result, the bridge portion 513 is formed.

Next, the two straight portions 91 and 92 are each bent in the thickness direction. By doing so, as illustrated in the fourth diagram from above in FIG. 9, the body portion 510, the first terminal portion 511, and the second terminal 512 are formed. As a result, the U phase bus bar 51 having the body portion 510, the first terminal portion 511, the second terminal portion 512, and the bridge portion 513 are obtained.

Further, as illustrated in the second diagram from above in FIG. 9, the relay portion 93 may have an inclined portion 931 and a pair of vertical portions 932. The inclined portion 931 inclinedly extends to the two straight portions 91 and 92. The pair of vertical portions 932 is positioned between both ends of the inclined portion 931 and the respective straight portions 91 and 92. The pair of vertical portions 932 substantially vertically extends to the straight portions 91 and 92. By doing so, an interval in a radial direction of the two straight portions 91 and 92 may be taken to be wide. Therefore, a distance between the U phase bus bar 51 and the V phase bus bar 52 may be taken to be longer, thereby insulating between the U phase bus bar 51 and the V phase bus bar 52. Since the relay portion 93 has the vertical portion 932, the relay portion 93 may be long in the radial direction. Therefore, the relay portion 93 is easily bent in the thickness direction.

If only the bent portion in the plate thickness direction of the U phase bus bar 51 after being manufactured is developed, the relay portion 93 becomes a state of the second diagram from above in FIG. 9. That is, the straight portion 91 corresponding to the body portion 510 and the second terminal portion 512 and the straight portion 92 corresponding to the first terminal portion 511 extend in substantially the same direction. Further, the relay portion 93 corresponding to the bridge portion 513 extends in a different direction from the straight portions 91 and 92. This shape is not a complicated shape as much as the related art. Therefore, even though in the shape as illustrated in the second diagram from above in FIG. 9, holes are bored by the press machining, a yield may be more improved than the related art.

Further, the W phase bus bar 53 has the same as the U phase bus bar 51, such that it may be manufactured in the same sequence as one illustrated in FIG. 9. Further, the V phase bus bar 52 is obtained by bending the metal plate 90 only in the thickness direction to form the arc-shaped portion 520 and the pair of terminal portions 521 and 522.

Next, the bus bar 54 for the neutral point is prepared (step S2). The bus bar 54 for the neutral point is obtained by, for example, connecting the plurality of bus bar members to each other. Each of the bus bar members is obtained by, for example, bending the stripe-shaped metal plate in the thickness direction. Further, the timing when the bus bar 54 for the neutral point is prepared may be earlier than step S1 and may be at the same time as step S1.

If the U phase bus bar 51, the V phase bus bar 52, the W phase bus bar 53, and the bus bar 54 for the neutral point are prepared, next, these bus bars 51 to 54 are disposed at the inside of a mold for resin molding (step S3). Here, at least some of the respective bus bars 51 to 54 are disposed in cavities formed by a pair of molds vertically disposed.

Next, a melted resin flows in the cavity of the mold (step S4). The melted resin flows from a gate provided in the mold and is spread into the cavity while contacting the U phase bus bar 51, the V phase bus bar 52, the W phase bus bar 53, and a surface of the bus bar 54 for the neutral point. In this case, the melted resin flows in the gap among the U phase bus bar 51, the V phase bus bar 52, and the W phase bus bar 53. By doing so, three bus bars 51 to 53 which are disposed to be close to one another are insulated from one another.

When the melted resin is widely spread into the cavity of the mold, the melted resin in the mold is cooled and solidified (step S5). The melted resin in the mold is solidified to become the bus bar holder 55. Further, the melted resin is solidified and thus the U phase bus bar 51, the V phase bus bar 52, the W phase bus bar 53, the bus bar 54 for the neutral point, and the bus bar holder 55 are fixed to one another. By doing so, the bus bar unit 23 is obtained.

Next, the pair of molds are opened and the bus bar unit 23 is released from the mold (step S6).

As such, the bus bar unit 23 of this embodiment is obtained by the insert molding. The molding of the bus bar holder 55 and the fixing of the bus bar holder 55 to each of the bus bars 51 to 54 may be simultaneously performed by using the insert molding. Therefore, compared to the case in which only the bus bar holder 55 is molded and then each of the bus bars 51 to 54 are fixed to the corresponding bus bar holder 55, the number of manufacture processes of the bus bar unit 23 may be reduced.

Some of the respective bus bars 51 to 54 may be completely covered with resin configuring the bus bar holder 55 by using the insert molding. For this reason, the rigidity of the bus bar unit 23 may be more increased as a whole.

3. Modification Example

Hereinabove, the exemplary embodiment of the present disclosure is described but the present disclosure is not limited the above-mentioned embodiments.

Figure 10:
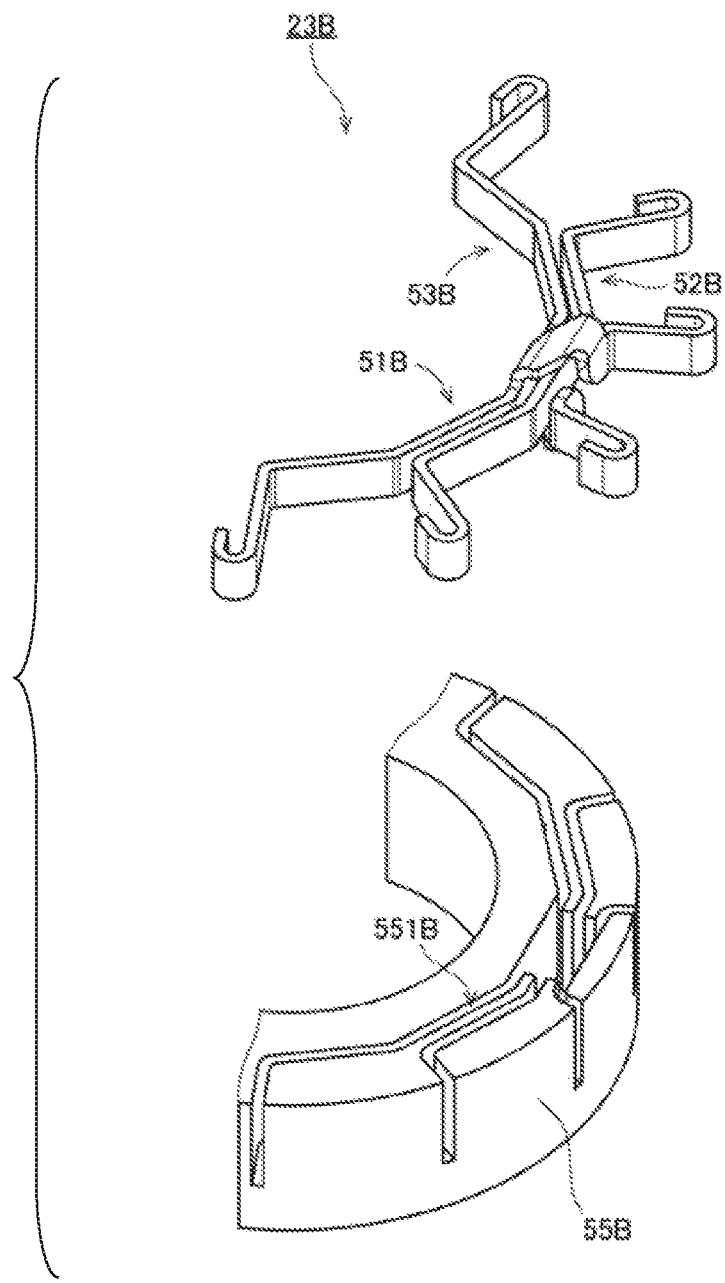
FIG. 10 is a partial exploded perspective view of a bus bar unit according to a modification example.

FIG. 10 is a partial exploded perspective view of a bus bar unit 23B according to one modification example. In FIG. 10, the bus bar holder 55B is separately molded from the U phase bus bar 51B, the V phase bus bar 52B, and the W phase bus bar 53B. The bus bar holder 55B has a bus bar holding groove 551B depressed downward from an upper surface thereof. Therefore, after the bus bar holder 55B is molded, the U phase bus bar 51B, the V phase bus bar 52B, and the W phase bus bar 53B are inserted into the bus bar holding groove 551B of the bus bar holder 55B. In this case, at least a portion of the respective bus bars 51B is disposed in the bus bar holding groove 551B. By doing so, the U phase bus bar 51B, the V phase bus bar 52B, and the W phase bus bar 53B may be maintained in the bus bar holder 55B without performing the insert molding having high difficulty.

According to the embodiment, in connection with the U phase bus bar 51 and the W phase bus bar 53, the center position in the axial direction of the body portion and the center position in the axial direction of the first terminal portion are substantially the same. However, the axial position of the body portion and the axial position of the first terminal portion may at least partially overlap with each other.

According to the embodiment, the U phase bus bar 51 and the W phase bus bar 53 have the bridge portion lying across the V phase bus bar 52. However, only one of the plurality of bus bars may have the bridge portion lying across the other bus bar. Further, all the bus bars included in the bus bar unit may have the bridge portion lying across other bus bars.

The embodiment describes the U phase bus bar, the V phase bus bar, and the W phase bus bar, but the structure of the present disclosure may be applied to the plurality of bus bars including the bus bar for the neutral point. The embodiment describes the bus bar unit used in the 3-phase synchronous motor, but the bus bar unit of the present disclosure may be used in a multi-phase synchronous motor other than the 3-phase synchronous motor.

According to the embodiment, the stripe-shaped metal plate 90 illustrated in the first portion from above in FIG. 9 is perforated and the corresponding metal plate 90 is bent. However, the metal plate having substantially an S-letter shape illustrated in a second portion from above in FIG. 9 may be directly perforated. Even in this case, the perforated metal plate does not have the complicated shape as much as the related art, and therefore may increase a yield more than before.

The present disclosure may be used in, for example, the bus bar unit and the motor.

While embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A bus bar unit used in a motor comprising a coil, the bus bar unit comprising:
   a plurality of bus bars comprising a metal material, wherein at least one of the plurality of bus bars comprises:
      a body portion extending in a substantially circumferential direction relative to a center axis of the motor;
      a first terminal portion electrically connected to the coil of the motor; and
      an arc-shaped bridge portion connecting a first end portion of the body portion to the first terminal portion,
   wherein
      the bridge portion lies across at least an other one of the plurality of bus bars, and
      an axial position of the body portion and an axial position of the first terminal portion at least partially overlap with each other, and
      the first terminal portion includes:
         a first connecting portion connecting to the bridge portion and extending in a circumferential direction; and
         a second connecting portion extending in a radial direction from an end of the first connecting portion and connecting to the coil of the motor.

2. The bus bar unit of claim 1,
   wherein a center position in an axial direction of the body portion and a center position in an axial direction of the first terminal portion are substantially the same.

3. The bus bar unit of claim 1,
wherein the bridge portion comprises a top plate portion extending in a substantially axial direction and at a right angle to the center axis.

4. The bus bar unit of claim 1,
wherein at least one bus bar of the plurality of bus bars is a bent strip-shaped board, and
at least the first terminal portion of the at least one bus bar is bent only in a thickness direction of the board.

5. The bus bar unit of claim 4,
wherein if the at least one bus bar is bent in a plate thickness direction,
the body portion of the at least one bus bar and the first terminal portion of the at least one bus bar extend in substantially a same direction, and
the bridge portion extends from a different direction from the body portion and the first terminal portion.

6. The bus bar unit of claim 1,
wherein the bus bar unit is used in a multi-phase synchronous motor, and
lead wires corresponding to each phase are each connected to the plurality of bus bars.

7. The bus bar unit of claim 6,
wherein the bus bar unit is used in a 3-phase synchronous motor,
the lead corresponding to the 3 phase are each connected to the three bus bars, and
at least two of the three bus bars have a same shape.

8. The bus bar unit of claim 1, wherein
the plurality of bus bars include a first bus bar, a second bus bar, and a third bus bar,
at least the first bus bar and the second bus bar have a corresponding bridge portion,
the bridge portion of the first bus bar overlaps one side of the third bus bar in an axial direction of the third bus bar,
the bridge portion of the second bus bar overlaps an other side of the third bus bar in the axial direction of the third bus bar, and
the bridge portion of the first bus bar and the bridge portion of the second bus bar cross each other when viewed from a plane.

9. The bus bar unit of claim 8,
wherein the body portion of the first bus bar and the body portion of the second bus bar are disposed at different positions in a circumferential direction.

10. The bus bar unit of claim 1,
wherein the at least one bus bar further comprises:
a second terminal portion extending in a radial direction from an end portion of the other side of the body portion.

11. The bus bar unit of claim 1,
further comprising a bus bar holder comprising a resin material and holding the plurality of bus bars.

12. The bus bar unit of claim 11,
wherein the bus bar holder is a resin molding product using at least some of the plurality of bus bars as an insert portion.

13. The bus bar unit of claim 11,
wherein the bus bar holder comprises a bus bar holding groove, and
at least some of the plurality of bus bars is fitted in the bus bar holding groove.

14. A motor, comprising:
a rotary unit rotatably supported on a center axis,
wherein the stationary unit comprises:
a plurality of coils arranged in a circumferential direction based on the center axis, and
the bus bar unit described in claim 1, and
the rotary unit comprises:
magnets facing magnetic cores of the plurality of coils.

15. A bus bar unit used in a motor comprising a coil, the bus bar unit comprising:
a plurality of bus bars comprising a metal material, a first bus bar, a second bus bar, and a third bus bar, at least the first bus bar and the second bus bar of the plurality of bus bars comprising:
a body portion extending in a substantially circumferential direction relative to a center axis of the motor;
a first terminal portion electrically connected to the coil of the motor, the first terminal portion having an axial position at least partially overlapping an axial position of the body portion; and
an arc-shaped bridge portion connecting a first end portion of the body portion to the first terminal portion,
wherein
the bridge portion of the first bus bar passes across one side of the third bus bar in an axial direction of the third bus bar, and
the bridge portion of the second bus bar passes across an other side of the third bus bar in the axial direction of the third bus bar.

16. The bus bar unit of claim 15, wherein the bridge portion of the first bus bar and the bridge portion of the second bus bar overlap when viewed from a plane perpendicular to the center axis.

17. The bus bar unit of claim 16, wherein the third bus bar is between overlapping portions of the bridge portion of the first bus bar and the bridge portion of the second bus bar.

18. A bus bar unit comprising:
a first bus bar, a second bus bar, and a third bus bar, at least the first bus bar and the second bus bar of the plurality of bus bars comprising:
a body portion extending in a substantially circumferential direction relative to a center axis;
a first terminal portion having an axial position at least partially overlapping an axial position of the body portion; and
an arc-shaped bridge portion connecting a first end portion of the body portion to the first terminal portion,
wherein
the bridge portion of the first bus bar passes across one side of the third bus bar in an axial direction of the third bus bar, and
the bridge portion of the second bus bar passes across an other side of the third bus bar in the axial direction of the third bus bar.

19. The bus bar unit of claim 18, wherein the third bus bar is between overlapping portions of the bridge portion of the first bus bar and the bridge portion of the second bus bar.

20. The bus bar unit of claim 18, wherein the body portion of the first bus bar and the body portion of the second bus bar are disposed at different positions in the substantially circumferential direction.

* * * * *